United States Patent [19]
Wynne, II

[11] 3,847,353
[45] Nov. 12, 1974

[54] SPRAY DEVICE FOR COATING THE OUTSIDE OF PIPE

[76] Inventor: J. Harry Wynne, II, 5300 Pershing Ave., Houston, Tex. 76107

[22] Filed: Nov. 14, 1973

[21] Appl. No.: 415,827

[52] U.S. Cl.............. 239/184, 239/289, 118/258, 118/307, 118/319
[51] Int. Cl....... B05b 3/18, B05c 5/00, B05b 13/04
[58] Field of Search .......... 239/140, 141, 146, 178, 239/148, 149, 176, 264, 265, 184, 331, 289; 118/244, 246, 258, 263, 300, 319–321, 428, 305, 307, 216, 218

[56] References Cited
UNITED STATES PATENTS

| | | | |
|---|---|---|---|
| 1,313,670 | 8/1919 | Burdick | 118/321 |
| 2,044,778 | 6/1936 | Halstead | 118/307 X |
| 2,357,144 | 8/1944 | Stair | 118/307 |
| 2,687,109 | 8/1954 | Krukonis | 118/258 X |
| 2,851,005 | 9/1958 | Pledger | 118/307 |
| 3,662,709 | 5/1972 | Janco | 239/184 X |

Primary Examiner—Robert S. Ward, Jr.
Attorney, Agent, or Firm—Kurt S. Myers

[57] ABSTRACT

A spray device, especially adapted for coating pipe, has a rotating means which carries the spray means around the object such as pipe being coated. The rotating means rotates within an outer body. Bearings are positioned between the outer body and rotating means to form at least one fluid chamber so that liquid coating components may be passed through the outer body to the fluid chamber which is in fluid communication with the rotating spray means.

10 Claims, 5 Drawing Figures

SPRAY DEVICE FOR COATING THE OUTSIDE OF PIPE

BACKGROUND OF THE INVENTION

1. Field of the Invention. The present invention is directed to a spray device wherein the spray means for coating the object is rotated around the object such as a pipe to coat the object in a uniform manner.

2. Prior Art. It has heretofore been the practice in the coating of pipe to pass short sections of the pipe, while the pipe is rotated, through a stationary spray device. The coating of pipe for pipelines has posed a substantial problem since the pipe requires coating not only to protect the pipe from corrosion and other deleterious affects, but requires a coating for insulation purposes. The sections of pipe then require welding together so as to extend over hundreds of miles. If the pipe has been coated before welding, the welding operation often leaves areas not properly coated or in some way damaged by the welding operation or in some instances, even making the welding operation more difficult and costly. The present invention overcomes the many problems of the prior art since it is adapted to be utilized to coat a pipe of any length, without requiring the pipe to be rotated, thus is specifically suitable for coating a pipeline. Furthermore, the coating is applied after the individual sections of pipe have been welded together and before the welded sections of pipe are placed into the ground.

In a novelty search, the following patents were cited:

| | |
|---|---|
| 2,044,778 | 3,362,109 |
| 2,194,268 | 3,495,288 |
| 3,306,310 | |

SUMMARY OF THE INVENTION

The present invention is directed to a spray device especially adapted for the coating of pipe. The spray device comprises a rotating means which rotates within an outer body and around the object to be coated. Preferably the object to be coated is a symmetrical object such as a pipe. The spray device has a rotating means which carries the spray means which not only rotates around the object to be coated but is adapted to move along the axis of symmetry, such as the axis of a pipe, so as to fully coat the object. In the coating device of the present invention the rotating means has connected thereto a plurality of guide means which contact the outer periphery of the object being coated and drive the spray device along the axis of the object. The guide means comprises a wheel on an adjustable stem so that each wheel of the guide means will contact the outer periphery of the object being coated. Further, the wheels of the guide means are pitched or canted with respect to the axis of the object so as to drive the spray device along the axis of the object and provide a uniform coating thereon.

In a specific embodiment of the present invention, there are bearing means and seals between the rotating means and the outer body to provide three fluid chambers for the three components used in a preferred coating material to be coated on pipe for pipelines.

DESCRIPTION OF THE PREFERRED EMBODIMENTS

Figure 1:
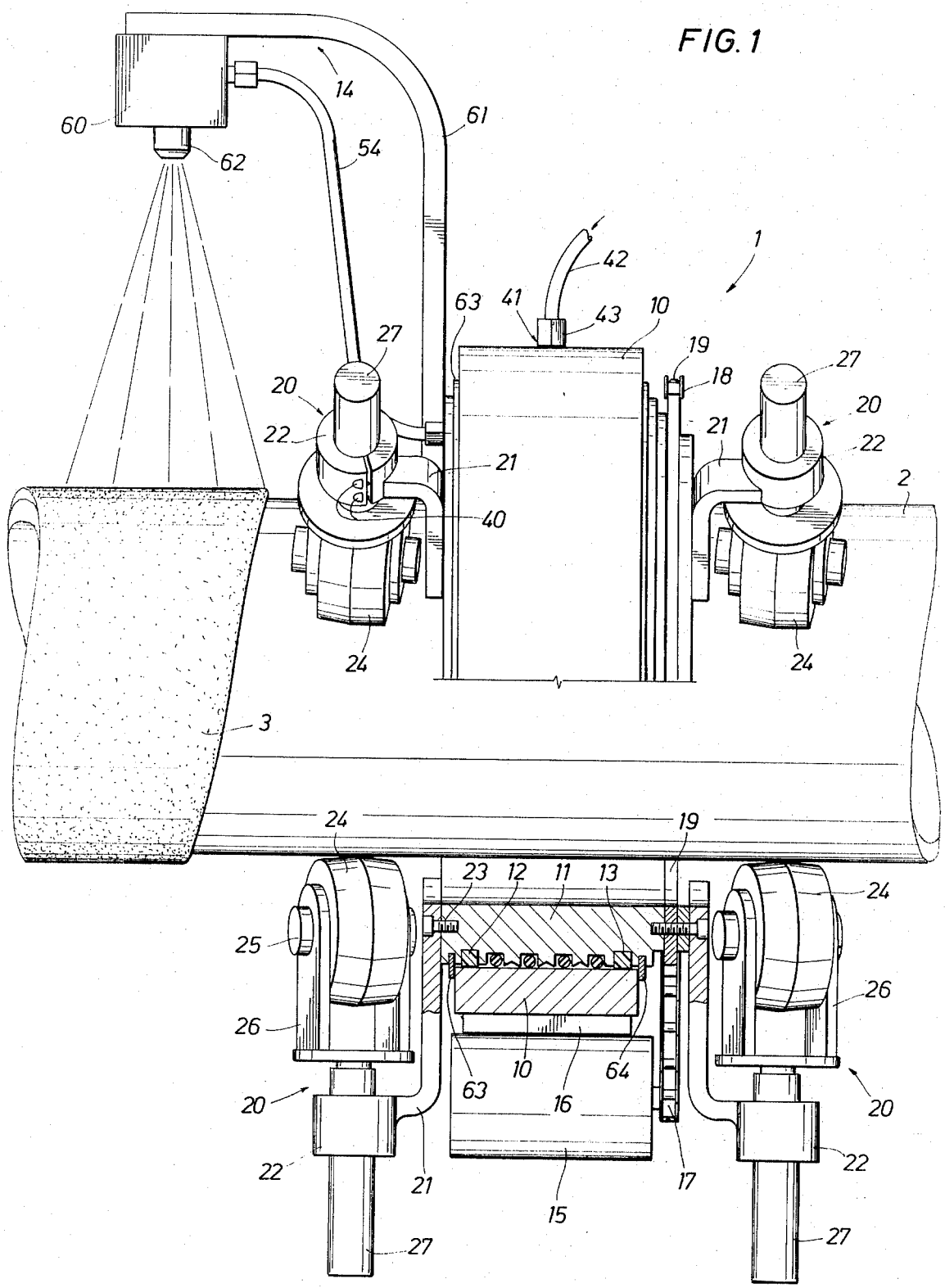
FIG. 1 is a side view of the preferred embodiment, a portion of which is in cross-section, setting forth the spray device surrounding a pipe which is being coated.

Referring to FIG. 1, the spray device 1 of the present invention is shown surrounding an object 2 which may be a pipe to provide a uniform coating 3 on the object 2. The spray device 1 has an outer body means 10 and a rotating means 11 which rotates within the outer body means 10. Bearing 12 and bearing 13 provide bearing means between the outer body 10 and the inner rotating means 11 as well as forming between the two bearing members at least one fluid chamber. Attached to the inner rotating means 11 is a spray means 14, to be described in more detail hereinafter, which rotates around the object or pipe 2 to be coated.

The outer body means 10 has attached thereto a drive means 15 such as a hydraulic motor. The motor 15 is attached to the outer body means 10 by connecting means 16. The motor drives a drive gear 17 which has attached thereto a drive pulley or chain 18. By means of a drive chain 18 which is attached to a drive sprocket 19 on the rotating inner means 11, the inner rotating means is rotated around the object 2. The motor 15 may be a fixed speed motor or it may be a variable speed motor so that changes in the speed of rotation of the inner rotating means 11 may be accomplished.

Figure 2:
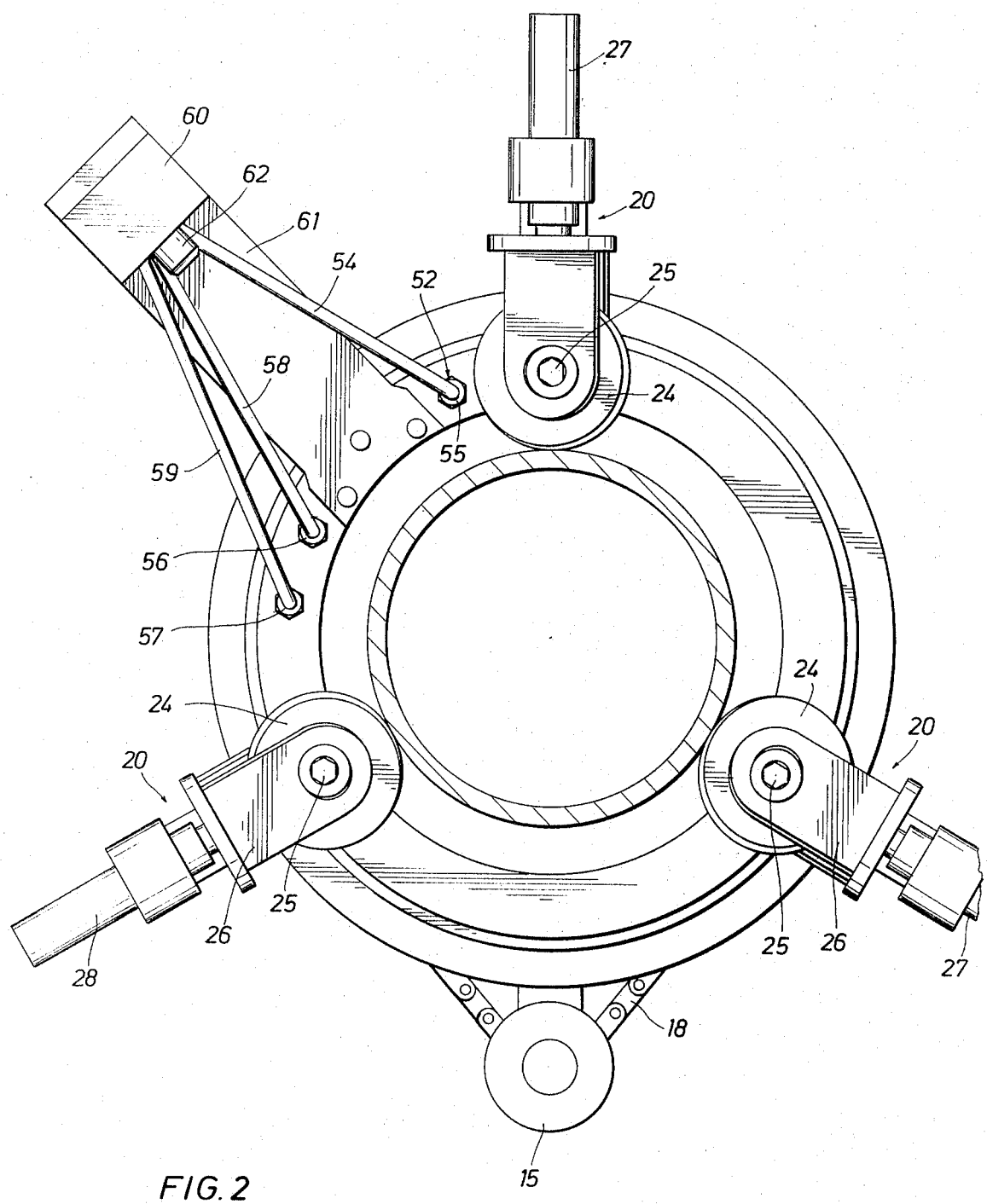
FIG. 2 is an end view of the embodiment shown in FIG. 1 rotated to show the motor.
Figure 5:
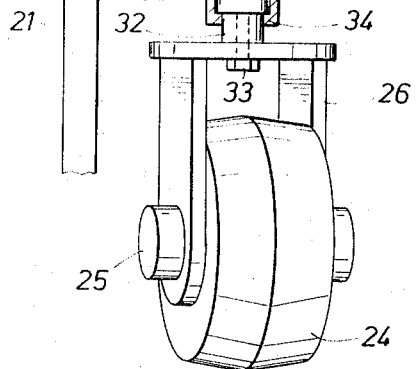

Referring to FIGS. 1, 2, and 5, attached to rotating means 11 are a plurality of guide means 20. In the preferred embodiment, there are six guide means 20, three on either side of the spray device 1 and spaced at about 120° from each other. Each guide means 20 has an arm 21 which terminates at one end in an adjustable ring 22. Each arm 21 of the guide means 20 is bolted by bolt 23, or otherwise secured, to the rotating means 11. The guide means 20 further comprise a wheel 24 on an axle 25 which is connected to a yoke 26. Most of the guide means 20 have a shaft 27 extending from the yoke 26. However, at least one of the guide means 20 will be a spring loaded guide means having a shaft 28 which is not directly connected to the yoke 26. Such a spring loaded guide means 20 is shown in FIGS. 2 and more specificaly, in FIG. 5. By adjusting the stems 27 or 28 within the rings 22, the roller 24 may be positioned so that when the spray device 1 surrounds an object 2, the rollers 24 will be in contact with the object 2. In other words, the shaft 27 or 28 are so positioned in the ring 22 that the rollers 24 define a circle or a circumference having a diameter which is the same as the outside diameter of the object 2 to be coated. The purpose of the spring loaded guide means 20, as more specifically depicted in FIG. 5, is to take up the minor variations which may occur in the object 2 to be coated. Likewise, it is easier to assemble the spray device 1 around an object 2 to be coated.

Referring to FIG. 5, the spring loaded guide means 20 has a shaft 18 which may be held in ring 22 by means of a set screw 29. The spring loaded guide means 20 has a retractable wheel spindle 30 which has an enlarged portion 31 near the bottom and a smaller portion 32 which is bolted by bolt 33 to the yoke 26. An internal retaining ring 34 prevents the retractable wheel spindle 30 from falling out of the fixed shaft 28. Above the enlarged portion 31 and surrounding the retractable wheel spindle 30 is a spring 35. The shaft 28 of the spring loading guide means 20 differs from the solid shafts 27 by being hollow but also is internally threaded with threads 36. A spring loading means 37 having a opening 38 which surrounds the retractable wheel spindle 30, may be screwed by means of the threads 36 within the shaft 28. The loading on the spring may be adjusted by the amount in which the spring loading means 37 is screwed into the shaft 28. A special tool (not shown) may be used to adjust the amount of spring loading as well as disengaging the tension of the spring 35. An anti-rotation pin 39 extends through shaft 28 into a slot in the enlarged portion 31 so that when the shaft 28 is held firmly and securely within ring 22, the wheel 24 can not rotate with respect to the shaft 28.

The stems 27 and 28 are not only adjustable depending upon the diameter of the object 2 as to the extent the stems 27 or 28 extend from the ring 22, but are adjustable so as to vary the pitch of the roller 24 in relation to the object 2. The pitch of the rollers 24 or, in other words, the angle of the wheel 24 to the axis of the object 2 determines the extent of the travel of the spray device 1 along the axis of the object 2 being coated. The nature of the travel of the spray device 1 is a helical path travelling as the rotating means is rotated about the object 2. Thus, after the adjustments of the stems 27 and 28 for both the diameter of the object 2 and pitch are made, the stems are fixed within the ring either by the set screw 29 as shown in FIG. 5 or more preferably, by means of screws 40 when the rings 22 are split (see FIG. 1).

The outstanding advantage of the spray device 1 of the present invention is that it surrounds the object 2 which is to be coated such as a pipe and the rotating means 11 rotates uniformly around the object 2. For the coating composition to be in fluid communication with the spray means 14, the outer body 10 has fluid inlets 41 which may be made up of a flexible pipe 42 and a coupling 43.

Figure 3:
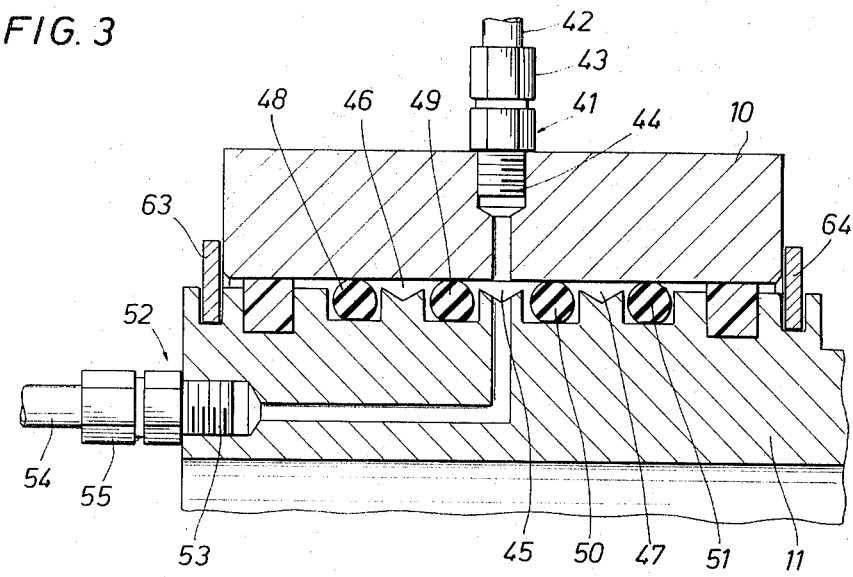
FIG. 3 is an enlarged section showing the details of a fluid inlet and outlet to one of the fluid chambers of the spray device.
Figure 4:
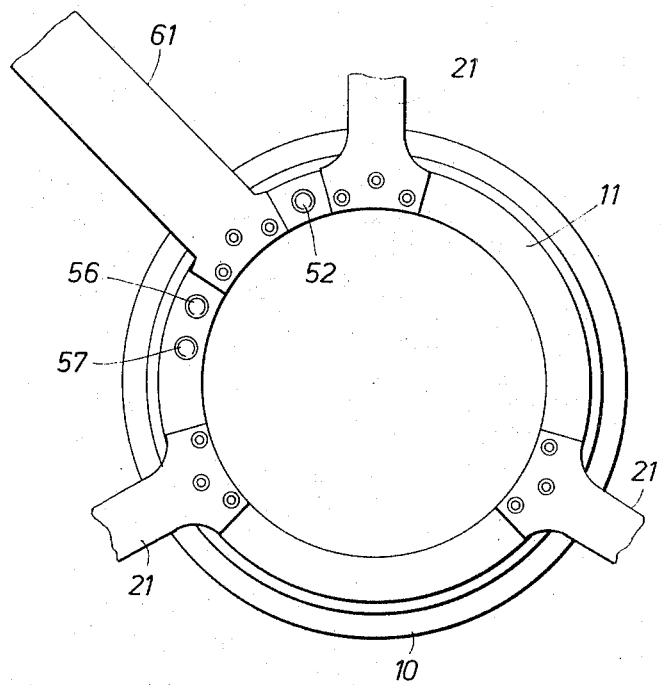
FIG. 4 is a partial section of the rotating means and the outer body means of the spray device; and, FIG. 5 is a detailed view partially in cross-section of one of the spring loaded guide means of the spray device.

Referring to FIG. 3, wherein a more detailed cross-sectional view of one of the inlets 41 is disclosed. The inlet 41 is located in the outer body means 10 and has a fluid port 44 which is in fluid communication with a chamber 45 between the outer body means 10 and the rotating means 11. In the preferred embodiment chamber 45 is one of three chambers, the other two being chambers 46 and 47, respectively. The fluid chambers are formed between the bearing members 12 and 13, respectively, by means of seals 48, 49, 50 and 51, respectively, which maintain the fluid components of the coating composition in the chambers 45, 46, and 47, respectively. The number of seals depends on the number of fluid chambers desired or more specifically on the number of components which are utilized in the coating composition. From each of the chambers 45, 46, and 47, respectively, there is fluid communication to an outlet such as an outlet 52. The outlet 52 has a port 53 which is located in the outer periphery of rotating means 11 and is in fluid communications with chamber 45. A part of the outlet 52 is a connecting tube or pipe 54 having a coupling 55 whereby one of the coating components is passed to the spray device 14. In the preferred embodiment of the present invention, the other separate fluid components of the coating composition are passed to the spray device 14 through outlets 56 and 57 (shown in FIG. 2), which include connecting tubes or pipes 58 and 59, respectively.

Each of the connecting tubes 54, 58 and 59, is connected to a mixing chamber or manifold 60 of the spray means 14. The mixing chamber 60 is maintained in position by a support rod 61. The components of the coating composition are thus mixed in chamber 60 and sprayed through nozzle 62, which is a single nozzle or a plurality of nozzles in any number of configurations, after the components have been mixed. A preferred coating composition is a mixture of an isocynate with a polyol introduced to the mixing chamber or manifold 60 in proper proportions and sprayed from a nozzle 62 to form the desired coating 3. Solvent is introduced at the conclusion of spraying to flush the manifold 60 and nozzle 62 clear of the components and any reacted mixture.

The spray device 1 of the present invention may be easily assembled or dismantled. The outer body 10 slides over rotating means 11 when the guide means 20, drive chain 18 and drive sprocket 19 are not attached to the rotating means 11. The outer body 10 is held in position by retaining rings 63 and 64. However, only one retaining ring is necessary, it being on the same side as the drive chain 18 since a shoulder (not shown) on the rotating means 11 may take the place of retaining ring 63. After positioning the rotating means 11 in the outer body 10, the drive sprocket 19 is attached to the rotating means 11 along with the drive chain 18. By providing an easy way of dismantling the spray device 1, thorough cleaning may be carried out after extended use. Also, the seals 48, 49, 50 and 51, respectively, may be replaced as needed.

To operate the spray device 1 of the present invention, each of the guide means 20 is adjusted to the diameter of the object 2 being coated. For example, if a 6 inch pipe is being coated, each guide means 20 is adjusted so that the wheels 24 will touch the circumference of the 6 inch pipe and is accomplished by positioning the stems 27 or 28 within the rings 22. Each stem 27 and 28 is then rotated within the ring 22 to the desired angle of pitch. The pitch angle is set for a width of spray pattern and the amount of overlap required for adequate thickness of coating of insulation. Once this adjustment has been made on each guide means 20, the stems 27 or 28 are firmly and securely held within rings 22 either by tightening set screws 29 or by screws 40. A special tool (not shown) is then placed over each of the spring loaded guide means 20 so as to retract the spindle 30 of the spring loaded guide means 20. This allows additional clearance while the coating device 1 is placed over the end of the object 2, such as a pipe. The coating device 1 is lifted and placed around the end of the object 2 and when surrounding the object 2, the special tools holding the spring loaded spindles 30 in a retracted position are released, eliminating the extra clearance caused by the retraction of the spindles 30. The rotating means 11 is rotated around the object 2 by means of the motor 15 driving the drive sprocket 19 through drive wheel 17 and drive chain 18. This in turn rotates the spray means 14 in a helical path around object 2. At the same time coating components are supplied to spray means 14 where they are sprayed on object 2 as a uniform coating 3 such as a coating insulation. After all the object or pipe 2 to be insulated has been coated, the special tools are then used on the spring loaded guide means 20 to retract the spindles 30. The spray device 1 is then removed from the other end of the object or pipe 2 at which time the spray device 1 is clear of the object or pipe 2 without harming or in any way affecting the coating 3.

The nature and objects of the present invention having been completely described and illustrated and the best mode thereof contemplated set forth, what I wish to claim as new and useful and secure by Letters Patent is:

1. A spray device comprising:
   an outer body means,
   a rotating means which rotates within said outer body means,
   bearing means between said outer body means and said rotating means which forms at least one fluid chamber, and
   spray means on said rotating means in fluid communication with said chamber.

2. A spray device according to claim 1 wherein said spray means includes a mixing chamber and nozzle.

3. A spray device according to claim 1 wherein said rotating means has a plurality of guide means attached thereto.

4. A spray device according to claim 3 wherein said guide means comprises a wheel which rotates within a yoke.

5. A spray device according to claim 4 wherein a stem is connected to said yoke.

6. A spray device according to claim 4 wherein said wheel and yoke are spring loaded.

7. A spray device according to claim 1 which further includes:
   a motor attached to said outer body means,
   a drive gear driven by said motor,
   a drive sprocket attached to said rotating means, and
   a drive chain connecting said drive gear and said drive sprocket wherely said rotating means is rotated.

8. A spray device according to claim 1 wherein four seals are positioned between said bearing means to form three fluid chambers.

9. A spray device according to claim 1 wherein said rotating means has three guide means attached at about 120° spacings on sides thereof.

10. A spray device according to claim 9 wherein at least one of said guide means is spring loaded.

* * * * *